(12) United States Patent
Bryk

(10) Patent No.: US 9,688,143 B2
(45) Date of Patent: Jun. 27, 2017

(54) VEHICULAR SAFETY SYSTEM

(71) Applicant: Brian Bryk, Dallas, PA (US)

(72) Inventor: Brian Bryk, Dallas, PA (US)

( * ) Notice: Subject to any disclaimer, the term of this patent is extended or adjusted under 35 U.S.C. 154(b) by 28 days.

(21) Appl. No.: 14/845,646

(22) Filed: Sep. 4, 2015

(65) Prior Publication Data
US 2017/0066327 A1 Mar. 9, 2017

(51) Int. Cl.
| | | |
|---|---|---|
| *G06F 1/18* | (2006.01) | |
| *B60K 31/16* | (2006.01) | |
| *H04W 4/04* | (2009.01) | |
| *H04W 24/02* | (2009.01) | |

(52) U.S. Cl.
CPC .............. *B60K 31/16* (2013.01); *G06F 1/181* (2013.01); *H04W 4/04* (2013.01); *H04W 24/02* (2013.01)

(58) Field of Classification Search
CPC .......... B60K 31/16; G06F 1/181; H04W 4/04; H04W 24/02
See application file for complete search history.

(56) References Cited

U.S. PATENT DOCUMENTS

| | | | |
|---|---|---|---|
| D368,249 S | 3/1996 | Ferrer | |
| 5,627,891 A | 5/1997 | Gallagher et al. | |
| 6,726,636 B2 * | 4/2004 | Der Ghazarian | B60K 28/063 422/84 |
| 9,516,529 B2 * | 12/2016 | Tzannes | H04M 1/64 |
| 2005/0284908 A1 | 12/2005 | Greenwood et al. | |
| 2006/0273886 A1 * | 12/2006 | Yamamoto | G07C 9/00309 340/426.36 |
| 2008/0053340 A1 | 3/2008 | Comeaux et al. | |
| 2010/0234047 A1 * | 9/2010 | Lipovski | H04M 1/72552 455/456.4 |
| 2010/0279626 A1 | 11/2010 | Bradley | |
| 2011/0105097 A1 * | 5/2011 | Tadayon | H04W 4/025 455/418 |
| 2011/0275321 A1 * | 11/2011 | Zhou | H04M 1/6091 455/41.2 |
| 2012/0168516 A1 * | 7/2012 | Bolger | G06K 19/07758 235/492 |
| 2012/0214408 A1 * | 8/2012 | Chronister | H04W 12/06 455/26.1 |
| 2012/0253552 A1 * | 10/2012 | Skelton | B60K 28/063 701/2 |

(Continued)

FOREIGN PATENT DOCUMENTS

WO WO2010129939 11/2010

*Primary Examiner* — Calvin Cheung

(57) ABSTRACT

A vehicular safety system includes a vehicle, an electronic device and a case. The case has the electronic device being placed therein when the vehicle is utilized. The case is in electrical communication with the vehicle when the case is positioned within the vehicle. The case is in electrical communication with the electronic device such that the case determines a location of the electronic device with respect to the vehicle and the case. The case inhibits the vehicle from being driven when the case detects the electronic device is within the vehicle and the electronic device is not within the case. Thus, the case prevents the vehicle from being driven while the electronic device is available to be utilized. The case allows the vehicle to be driven when the case detects the electronic device is within the vehicle and the electronic device is within the case.

9 Claims, 4 Drawing Sheets

(56) References Cited

U.S. PATENT DOCUMENTS

| | | | |
|---|---|---|---|
| 2012/0268259 A1* | 10/2012 | Igel | B60R 25/00 340/426.11 |
| 2012/0326855 A1* | 12/2012 | Bantz | G07C 5/008 340/439 |
| 2013/0072174 A1* | 3/2013 | Enty | H04W 4/027 455/418 |
| 2014/0274026 A1 | 9/2014 | Mahar et al. | |
| 2016/0050309 A1* | 2/2016 | Gooberman | H04B 1/3822 455/418 |

* cited by examiner

VEHICULAR SAFETY SYSTEM

BACKGROUND OF THE DISCLOSURE

Field of the Disclosure

The disclosure relates to safety devices and more particularly pertains to a new safety device for preventing handheld usage of an electronic device in a vehicle.

SUMMARY OF THE DISCLOSURE

An embodiment of the disclosure meets the needs presented above by generally comprising a vehicle, an electronic device and a case. The case has the electronic device being placed therein when the vehicle is utilized. The case is in electrical communication with the vehicle when the case is positioned within the vehicle. The case is in electrical communication with the electronic device such that the case determines a location of the electronic device with respect to the vehicle and the case. The case inhibits the vehicle from being driven when the case detects the electronic device is within the vehicle and the electronic device is not within the case. Thus, the case prevents the vehicle from being driven while the electronic device is available to be utilized. The case allows the vehicle to be driven when the case detects the electronic device is within the vehicle and the electronic device is within the case.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
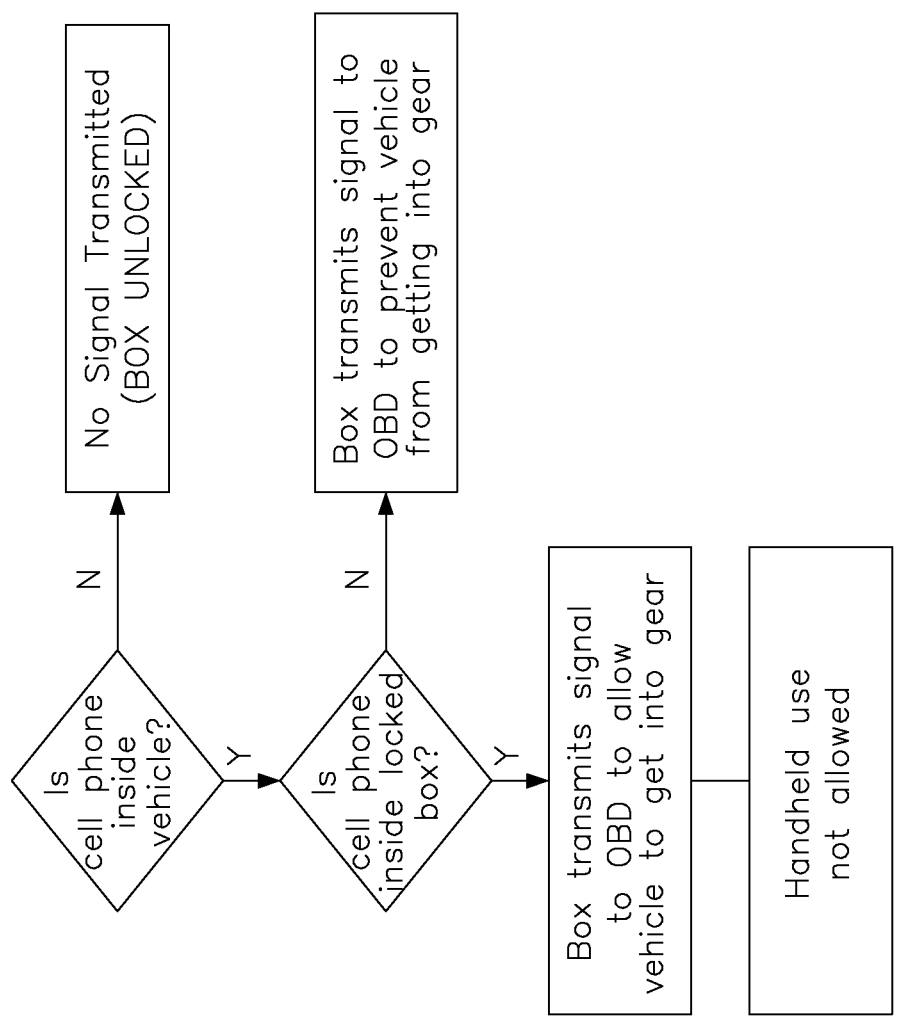
FIG. 1 is a logic tree view of a vehicular safety system according to an embodiment of the disclosure.
Figure 2:
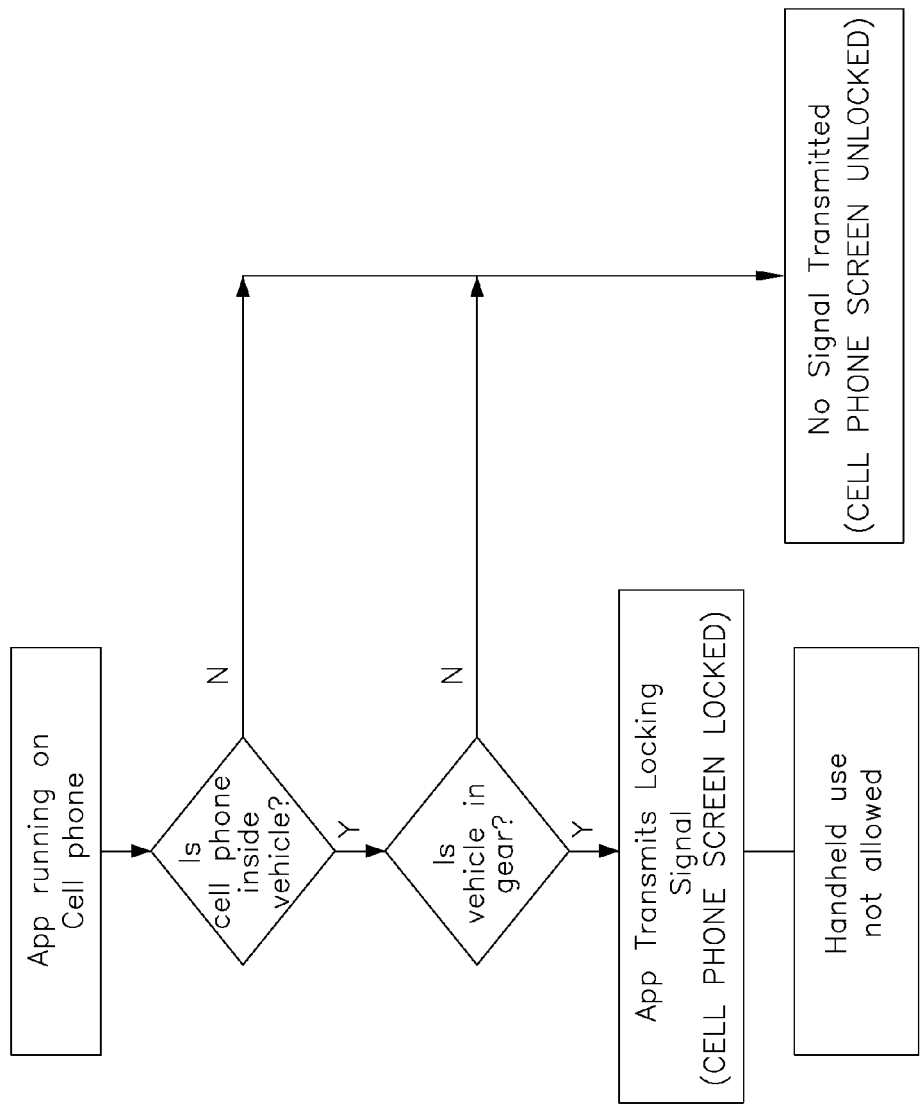
FIG. 2 is a logic tree view of an embodiment of the disclosure.
Figure 3:
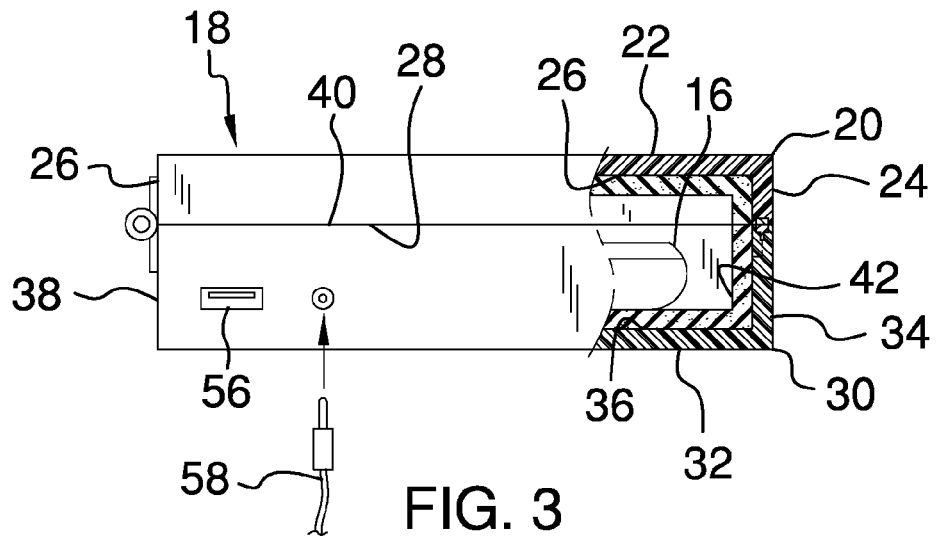
FIG. 3 is a front cut-away view of an embodiment of the disclosure.
Figure 4:
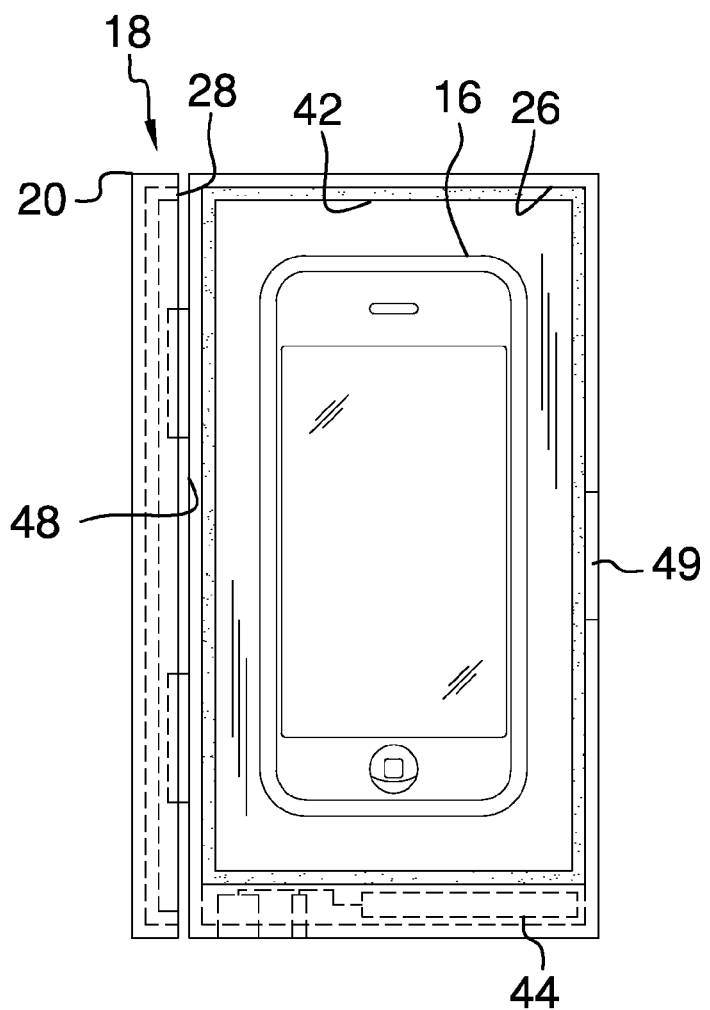
FIG. 4 is a top view of an embodiment of the disclosure.
Figure 5:
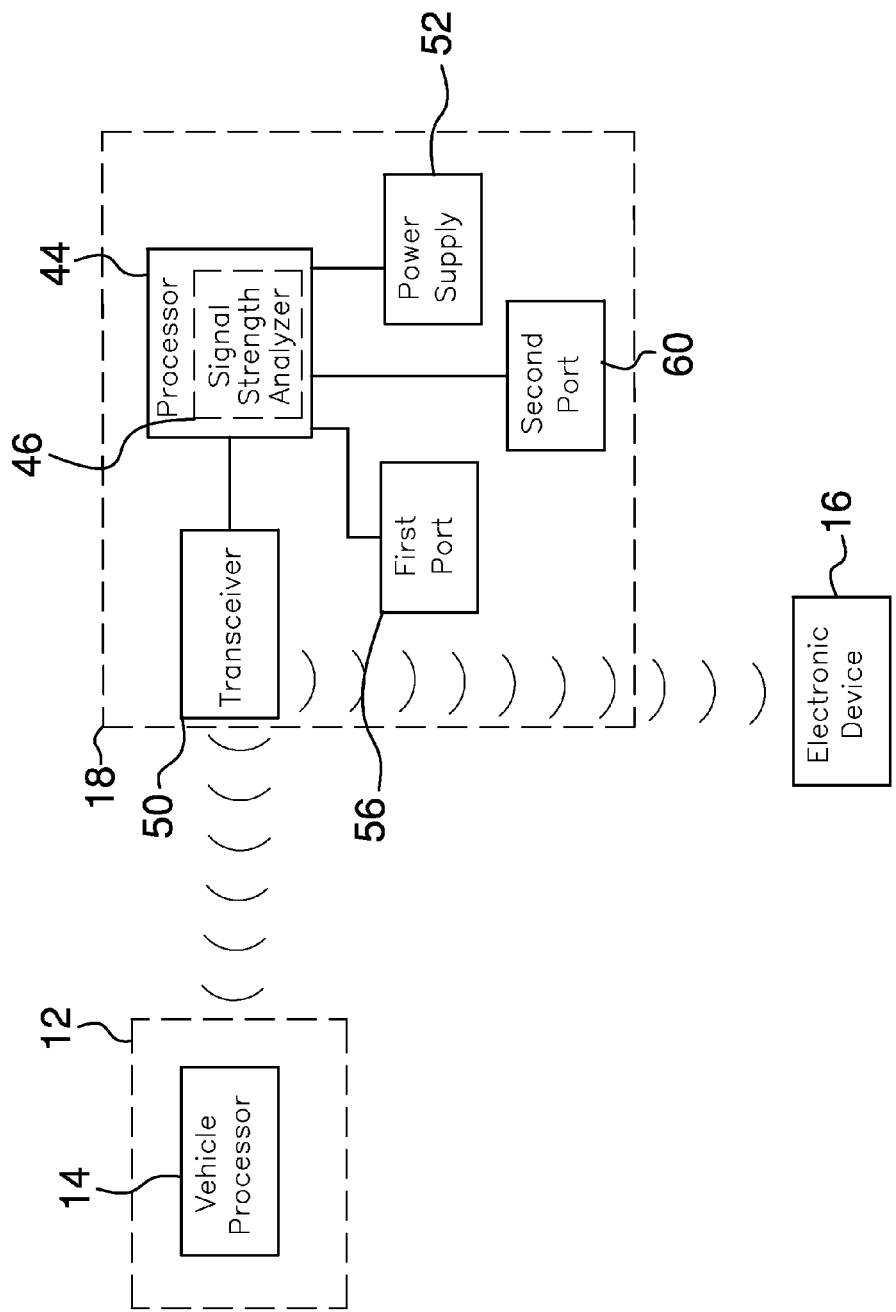
FIG. 5 is a schematic view of an embodiment of the disclosure.

With reference now to the drawings, and in particular to FIGS. 1 through 5 thereof, a new safety device embodying the principles and concepts of an embodiment of the disclosure and generally designated by the reference numeral 10 will be described.

As best illustrated in FIGS. 1 through 5, the vehicular safety system 10 generally comprises a vehicle 12 that has a vehicle processor 14. The vehicle 12 may comprise a passenger vehicle or the like. An electronic device 16 is provided and the electronic device 16 may comprise a Smartphone or the like. The electronic device 16 may be utilized for texting and for making phone calls.

A case 18 is provided and the case 18 has the electronic device 16 placed therein when the vehicle 12 is utilized. The case 18 is in electrical communication with the vehicle 12 when the case is positioned within the vehicle 12. The case 18 is in electrical communication with the electronic device 16 such that the case 18 determines a location of the electronic device 16 with respect to the vehicle 12 and the case 18. The case 18 inhibits the vehicle 12 from being driven when the case 18 detects the electronic device 16 is within the vehicle 12 and the electronic device 16 is not within the case 18. Thus, the case 18 prevents the vehicle 12 from being driven while the electronic device 16 is available to be utilized for handheld use. The case 18 allows the vehicle 12 to be driven when the case 18 detects the electronic device 16 is within the vehicle 12 and the electronic device 16 is within the case 18.

The case 18 comprises a lid 20 that has a top wall 22 and a peripheral wall 24 extending downwardly from the top wall 22. The lid 20 has an inner surface 26 and the peripheral wall 24 has a first side 26. The peripheral wall 24 has a distal edge 28 with respect to the top wall 22. The case 18 further comprises a box 30 that has a bottom wall 32 and a perimeter wall 34 extending upwardly from the bottom wall 32. The box 30 has an inner surface 36 and the perimeter wall 34 has a first side 38.

The first side 26 of the lid 20 is hingedly coupled to the first side of the box 30. The perimeter wall 34 has a distal edge 40 with respect to the bottom wall 32. The lid 20 is positionable in an open position such that the electronic device 16 is positionable within the box 30. The lid 20 is positionable in a closed position having the distal edge 28 of the lid 20 abutting the distal edge 40 of the box 30. A pad 42 is coupled to the case 18 and the pad 42 is positioned on the inner surface 26 corresponding to the lid 20 and the inner surface 36 corresponding to the box 30. The pad 42 cushions the electronic device 16 when the electronic device 16 is positioned within the case 18.

A processor 44 is positioned within the case 18 and the processor 44 includes a signal strength analyzer 46. A lock 48 is coupled to the lid 20 and the lock 48 is positioned on the distal edge 28 of the lid 20. A receiver 49 is coupled to the box 30 and the receiver 49 is positioned on the distal edge 40 of the box 30. The lock 48 engages the receiver 49 when the lid 20 is positioned in the closed position. The lock 48 may comprise a magnetic lock or the like.

A transceiver 50 is positioned within the case 18 and the transceiver 50 is electrically coupled to the processor 44. The transceiver 50 is in electrical communication with the vehicle processor 14 and the transceiver 50 is in electrical communication with the electronic device 16. The transceiver 50 may comprise a radio frequency transceiver or the like.

The processor 44 communicates a disable command to the vehicle processor 14 when the signal strength analyzer 46 detects the electronic device 16 is within the vehicle 12 and the electronic device 16 is not within the case 18. Thus, the vehicle 12 is inhibited from being driven while the electronic device 16 is accessible within the vehicle 12. The electronic device 16 may be used for handheld use while the vehicle 12 is disabled.

The processor 44 communicates an enable command to the vehicle processor 14 when the signal strength analyzer 46 detects the electronic device 16 is within the vehicle 12 and the electronic device 16 is within the case 18. Thus, the vehicle 12 is allowed to be driven when the electronic device 16 is not accessible within the vehicle 12. The electronic device 16 may not be used for handheld use while the vehicle 12 is enabled. A power supply 52 is positioned within the case 18. The power supply 52 is electrically coupled to the processor 44 and the power supply 52 comprises at least one battery 54.

A first port 56 is coupled to the perimeter wall 34 of the box 30 and the first port 56 is electrically coupled to the processor 44. The first port 56 may be electrically coupled to the vehicle processor 14 through a conductor 58 or the like. The first port 56 may comprise a USB port. A second port 60 is coupled to the box 30 and the second port 60 is electrically coupled to the processor 44. The second port 60 may be electrically coupled to the vehicle processor 14 through a conductor 58 or the like. The second port 60 may comprise an OBD port or the like. Each of the first 56 and second 60 ports may be utilized to place the processor 44 in electrical communication with the vehicle processor 14 if the vehicle 12 does not have wireless communication capabilities. The case 18 is an integral part of the vehicle 12. The case 18 may comprise a compartment within the vehicle 12 and the compartment may contain the electronic device 16. The vehicle 12 may be manufactured with the compartment.

In use, the electronic device 16 is initially synched with the processor 44 through the use of conventional Bluetooth communication or the like thereby facilitating the processor 44 to recognize the electronic device 16. The electronic device 16 is placed within the case 18 when the electronic device 16 is taken into the vehicle 12. The processor 44 communicates the enable command to the vehicle 12 thereby facilitating the vehicle 12 to be driven while the electronic device 16 is within the vehicle 12. The case 18 prevents the electronic device 16 from being utilized for handheld use while the vehicle 12 is in operation. The electronic device 16 may be utilized for wireless phone conversations if the vehicle 12 is equipped with wireless capabilities. The processor 44 communicates the disable command to the vehicle processor 14 when the electronic device 16 is removed from the case 18. Thus, the vehicle 12 may not be operated while the electronic device 16 is available to be utilized for handheld use. The vehicle 12 may be utilized for any purposed when the electronic device 16 is not placed within the vehicle 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicular safety system comprising:
   a vehicle;
   an electronic device;
   a case having said electronic device being placed therein when said vehicle is utilized, said case being in electrical communication with said vehicle when said case is positioned within said vehicle, said case being in electrical communication with said electronic device such that said case determines a location of said electronic device with respect to said vehicle and said case, said case inhibiting said vehicle from being driven when said case detects said electronic device is within said vehicle and said electronic device is not within said case such that said case prevents said vehicle from being driven while said electronic device is available to be utilized, said case allowing said vehicle to be driven when said case detects said electronic device is within said vehicle and said electronic device is within said case;
   a processor being positioned within said case, said processor including a signal strength analyzer;
   said case includes a lid and a box, said lid having a distal edge, said box having a distal edge, said lid being positionable in closed position; and
   a lock being coupled to said lid, said lock being positioned on said distal edge of said lid, said lock engaging said distal edge of said box when said lid is positioned in said closed position.

2. The system according to claim 1, wherein said case comprises a lid having a top wall and a peripheral wall extending downwardly from said top wall, said lid having an inner surface, said peripheral wall having a first side, said peripheral wall having a distal edge with respect to said top wall.

3. The system according to claim 2, wherein said case further comprises a box having a bottom wall and a perimeter wall extending upwardly from said bottom wall, said box having an inner surface, said perimeter wall having a first side, said first side of said lid being hingedly coupled to said first side of said box, said perimeter wall having a distal edge with respect to said bottom wall, said lid being positionable in an open position such that said electronic device is positionable within said box, said lid being positionable in a closed position having said distal edge of said lid abutting said distal edge of said box.

4. The system according to claim 3, wherein a pad being coupled to said case, said pad being positioned on said inner surface corresponding to said lid and said inner surface corresponding to said box, said pad cushioning said electronic device when said electronic device is positioned within said case.

5. The system of claim 1, further comprising:
   said vehicle having a vehicle processor; and
   said case being an integral component of said vehicle, said case comprising:
   said lid having a top wall and a peripheral wall extending downwardly from said top wall, said lid having an inner surface, said peripheral wall having a first side, said peripheral wall having said distal edge of said lid with respect to said top wall,
   said box having a bottom wall and a perimeter wall extending upwardly from said bottom wall, said box having an inner surface, said perimeter wall having a first side, said first side of said lid being hingedly coupled to said first side of said box, said perimeter wall having said distal edge of said box with respect to said bottom wall, said lid being positionable in an open position such that said electronic device is positionable within said box, said lid being positionable in said closed position having said distal edge of said lid abutting said distal edge of said box, a pad being coupled to said case, said pad being positioned on said inner surface corresponding to said lid and said inner surface corresponding to said box, said pad cushioning said electronic device when said electronic device is positioned within said case, a transceiver being positioned within said case, said transceiver being electrically coupled to said processor, said transceiver being in electrical communication with said vehicle processor, said transceiver being in electrical communication with said electronic device, said processor communicating a disable command to said vehicle processor when said signal strength analyzer detects said electronic device is within said vehicle and said electronic device is not within said case such that said vehicle is inhibited from being driven while said electronic device is accessible within said vehicle, said processor communicating an enable command to said vehicle processor when said signal strength analyzer detects said electronic device is within said vehicle and said electronic device is within said case such that said vehicle is allowed to be driven when said electronic device is not accessible within said vehicle, and a power supply being positioned within said case, said power supply being electrically coupled to said processor, said power supply comprising at least one battery.

6. A vehicular safety system comprising:

a vehicle;

an electronic device;

a case having said electronic device being placed therein when said vehicle is utilized, said case being in electrical communication with said vehicle when said case is positioned within said vehicle, said case being in electrical communication with said electronic device such that said case determines a location of said electronic device with respect to said vehicle and said case, said case inhibiting said vehicle from being driven when said case detects said electronic device is within said vehicle and said electronic device is not within said case such that said case prevents said vehicle from being driven while said electronic device is available to be utilized, said case allowing said vehicle to be driven when said case detects said electronic device is within said vehicle and said electronic device is within said case;

a processor being positioned within said case, said processor including a signal strength analyzer;

said vehicle having a vehicle processor; and a transceiver being positioned within said case, said transceiver being electrically coupled to said processor, said transceiver being in electrical communication with said vehicle processor, said transceiver being in electrical communication with said electronic device.

7. The system according to claim 6, wherein said processor communicates a disable command to said vehicle processor when said signal strength analyzer detects said electronic device is within said vehicle and said electronic device is not within said case such that said vehicle is inhibited from being driven while said electronic device is accessible within said vehicle.

8. The system according to claim 6, wherein said processor communicates an enable command to said vehicle processor when said signal strength analyzer detects said electronic device is within said vehicle and said electronic device is within said case such that said vehicle is allowed to be driven when said electronic device is not accessible within said vehicle.

9. A vehicular safety system comprising:

a vehicle;

an electronic device;

a case having said electronic device being placed therein when said vehicle is utilized, said case being in electrical communication with said vehicle when said case is positioned within said vehicle, said case being in electrical communication with said electronic device such that said case determines a location of said electronic device with respect to said vehicle and said case, said case inhibiting said vehicle from being driven when said case detects said electronic device is within said vehicle and said electronic device is not within said case such that said case prevents said vehicle from being driven while said electronic device is available to be utilized, said case allowing said vehicle to be driven when said case detects said electronic device is within said vehicle and said electronic device is within said case;

a processor; and a power supply being positioned within said case, said power supply being electrically coupled to said processor, said power supply comprising at least one battery.

* * * * *